United States Patent
Weisel

(10) Patent No.: US 7,878,222 B2
(45) Date of Patent: Feb. 1, 2011

(54) RIBBED HOSE FOR MILK EXTRACTION

(75) Inventor: Jeffrey Weisel, N. Lawrence, OH (US)

(73) Assignee: Beverly Sue Weisel, North Lawrence, OH (US)

( * ) Notice: Subject to any disclaimer, the term of this patent is extended or adjusted under 35 U.S.C. 154(b) by 0 days.

(21) Appl. No.: 12/394,316

(22) Filed: Feb. 27, 2009

(65) Prior Publication Data

US 2009/0217879 A1  Sep. 3, 2009

Related U.S. Application Data

(60) Provisional application No. 61/067,718, filed on Feb. 29, 2008.

(51) Int. Cl.
*F16L 11/00* (2006.01)

(52) U.S. Cl. .................. 138/121; 138/177; 138/178; 138/DIG. 10

(58) Field of Classification Search .......... 138/121, 138/177, 178; D23/266; 119/14.38
See application file for complete search history.

(56) References Cited

U.S. PATENT DOCUMENTS

| | | | |
|---|---|---|---|
| 125,596 A * | 4/1872 | Mayall | 138/118 |
| 169,699 A * | 11/1875 | Hazelton | 138/145 |
| 498,458 A * | 5/1893 | Callan | 138/173 |
| 928,606 A * | 7/1909 | Houghton | 138/177 |
| D88,666 S * | 12/1932 | Morse | D23/266 |
| 3,603,905 A * | 9/1971 | Schuttloffel | 333/241 |
| 3,891,007 A * | 6/1975 | Kleykamp | 138/121 |
| 4,119,123 A * | 10/1978 | Samuels | 138/122 |
| 4,312,383 A * | 1/1982 | Kleykamp | 138/103 |
| 4,410,012 A * | 10/1983 | Redding et al. | 138/121 |
| 5,048,572 A * | 9/1991 | Levine | 138/121 |
| D345,197 S * | 3/1994 | Potter | D23/266 |
| 5,495,873 A * | 3/1996 | Butkiewicz et al. | 138/114 |
| 5,641,498 A | 6/1997 | Loosemore | |
| 5,752,462 A | 5/1998 | Petersson | |
| D427,669 S * | 7/2000 | Ruuska | D23/266 |
| D445,170 S * | 7/2001 | Speicher | D23/266 |
| D454,386 S * | 3/2002 | Speicher | D23/266 |
| 6,701,865 B2 | 3/2004 | Petersson | |
| 6,789,579 B1* | 9/2004 | Ryhman | 138/121 |
| 7,322,379 B2* | 1/2008 | Evans | 138/114 |
| 2006/0174960 A1* | 8/2006 | Evans | 138/137 |
| 2008/0011383 A1* | 1/2008 | Paetow et al. | 138/177 |

FOREIGN PATENT DOCUMENTS

| | | |
|---|---|---|
| EP | 0 043 264 A1 | 1/1982 |
| EP | 0 134 854 A1 | 3/1985 |
| EP | 0 166 047 A1 | 1/1986 |
| EP | 1 902 613 A1 | 3/2008 |

\* cited by examiner

*Primary Examiner*—Patrick F Brinson
(74) *Attorney, Agent, or Firm*—Fay Sharpe LLP

(57) ABSTRACT

A hose used for extracting milk has an outer wall; an inner wall; at least two ribs formed on the outer wall; and at least one recess formed between said at least two ribs. A milk extraction system has a hose having an outer wall; an inner wall; a plurality of ribs formed on said outer wall, and the ribs extend beyond an outer perimeter of the outer wall.

16 Claims, 3 Drawing Sheets

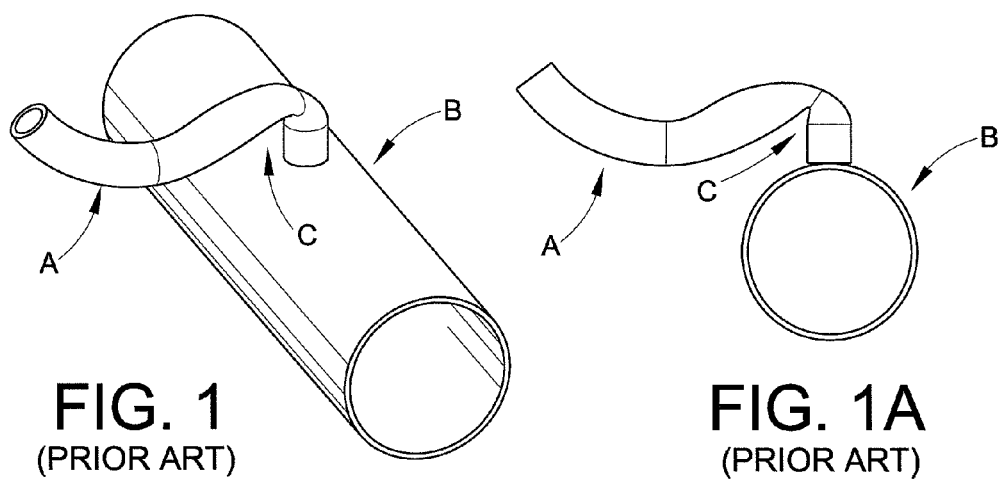
FIG. 1
(PRIOR ART)
FIG. 1A
(PRIOR ART)
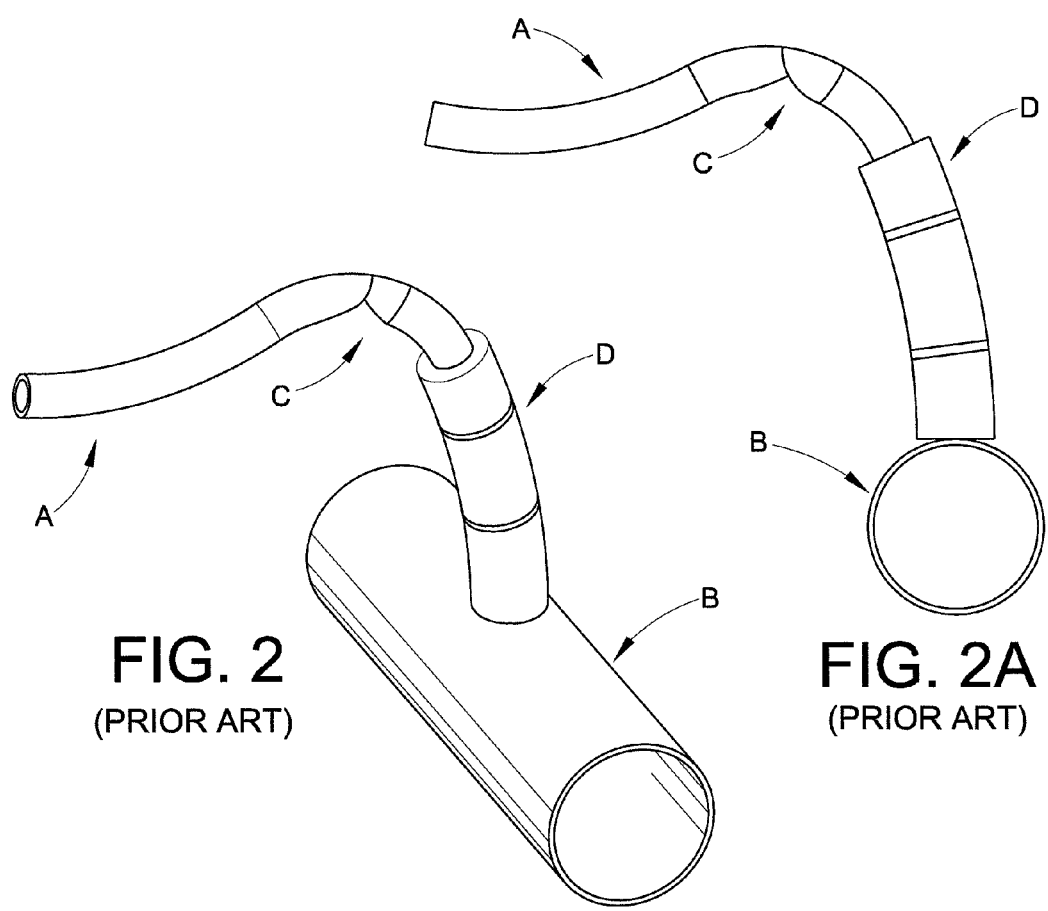
FIG. 2
(PRIOR ART)
FIG. 2A
(PRIOR ART)

RIBBED HOSE FOR MILK EXTRACTION

CLAIM OF PRIORITY

This application claims priority from Provisional Application Ser. No. 61/067,718 filed on Feb. 29, 2008, which is incorporated by reference herein.

BACKGROUND OF THE DISCLOSURE

Rubber hoses are currently used to extract and transport milk from a cow's udder to a bulk supply tank, as well as carrying a vacuum to harvest or extract the milk from the cow during farm or dairy operations. The milk extraction hose needs to be flexible and bendable or forgiving to allow the operator freedom of movement to position the milking device or station, which is attached to the milk hose under and onto the cow.

Many of the existing hoses used for extracting milk result in increasing disease in the cow, since the hoses do not have the flexibility needed to achieve optimum operating performance. That is, stiffness in the hose inhibits proper alignment and installation onto the cow, thus adding to the cause of disease. A lack of flexibility in the hoses also makes it more difficult for the operator to handle during the milking process. On the other hand, if the hose is too flexible it may bend too easily and fail shortly after installation on the cow.

The most commonly used milk extraction hoses are made of black nitrile rubber, silicone or PVC. The inside diameter of a milk hose typically ranges from about 9/16 inches to 7/8 inches. The length of the milk hose used can vary from farm to farm depending on the type of equipment used, averaging from approximately 4 feet in length or more per each operator station.

In addition to transporting the milk harvested from the cow, the milk extraction hose is exposed to a hot water soap and acid sanitizer cleaning at the end of each milking shift, which is typically at least twice a day on most dairy farms.

Rubber milk extraction hoses are exposed to very harsh environments both on the inside and outside of the hose. The hoses can be subjected to many harsh elements, such as, but not limited to UV rays, soaps, solvents, acids, chlorines, iodine, manure, milk, fats and proteins. Furthermore, the current compounds used to manufacture the hoses do not hold up well in these environments. As a result, breakdown in the compounds of the hose results in an increase in disease, both in the cows producing milk, and possibly the end users who consume the milk and dairy products. That is, diseases are caused by the carcinogenic compounds that are shed from the hoses' rubber, and are eventually deposited in the milk, along with the bacteria that is trapped in the rubber (absorbed due to the porosity and interior cracking of the hose), all of which cannot be washed out of the hose's compound.

During operation, a milk extraction hose remains under a constant vacuum ranging from about 10.5 in hg to 15.0 in hg. As a result of being exposed to such a vacuum, the compound of the hose deteriorates and loses the strength to maintain the hose's inside walls as a uniform circular opening, the result of which is collapse of the original round hose shape into an oval or oblong shape, which results in kinking or bending of the hose. A change in the inner opening or space of the hose and kinking create pressure differences and a restriction or change of vacuum in the hose during the harvesting of milk. These changes or restrictions in the vacuum directly result in the breakdown of compounds in the hose, which in turn results in an increase of disease in both the cows producing milk, and in the people consuming the dairy products.

Heat from the milk or the hot water wash for the hose weakens the rubber of the hose, which also results in collapse of the round inner diameter or shape of the hose, kinking or bending of the hose and eventual hose failure. The time and cost to replace worn out milk hose, combined with the general lack of knowledge of the disease caused through the use of worn out rubber, inhibits dairymen from replacing the hose more frequently than absolutely necessary. As a result, hoses are generally replaced only once a year. Often, however, milk hoses are completely worn out and deteriorate within 30 days. As a result, it is desired to develop a new and improved milk extraction hose which overcomes the above-mentioned deficiencies while providing better overall results.

BRIEF DESCRIPTION OF THE DISCLOSURE

The present disclosure relates to milk extraction hoses. Specifically, the disclosure relates to a ribbed milk extraction hose. One aspect of the of the milk extraction hose of the present disclosure is a "rib-and-valley" configuration formed by ribs and recesses on the exterior surface of the hose. The "rib-and-valley" configuration helps support the hose to resist collapsing of the diameter of the hose while the hose is placed under a vacuum. The ribbed configuration also resists the common kinking that occurs with the normal smooth outer diameter milk hose. The ribs increase the wall thickness and further act as an internal truss, which helps support the rubber material of the hose. The valleys or recesses provide thinner-walled areas, which offer more flexibility and bendability than the standard smooth wall hose, thus allowing the operator more freedom to attach the hose to the cow.

Another aspect of the rib-and-valley conformation of the hose of the present disclosure is it allows the operator to achieve smoother and greater performance from the hose, while decreasing potential disease for the cow and the end user, and increases the longevity of high quality, functional use from the hose.

Another aspect of the disclosure is a hose used for extracting milk including an outer wall, an inner wall, at least one pair of ribs formed on said outer wall, and a recess formed between each of the pair of ribs.

Another aspect of the disclosure is a milk extraction system having a hose comprising an outer wall, an inner wall, a plurality of ribs formed on the outer wall, the ribs extending beyond an outer perimeter of the outer wall.

Still another aspect of the milk extraction hose of the present disclosure is the provision of ribs formed on an outer surface of the hose to increase the wall thickness to better support the hose.

Another aspect of the milk extraction hose of the present invention is the provision of recesses or valleys formed on the outer surface of the hose to decrease the wall thickness to facilitate flexibility or bendability of the hose.

Still other aspects and benefits of the present disclosure will become apparent upon a reading of the following detailed description.

BRIEF DESCRIPTION OF THE DRAWINGS

FIG. 1 is a perspective view of a kinked or bent prior art hose which does not function properly for extracting milk from a cow;

FIG. 1A is a front elevational view of the prior art hose of FIG. 1;

FIG. 2 is a perspective view of a prior art sleeve which was used to attempt to reduce the kinking of the prior art hose of FIG. 1;

FIG. 2A is a front elevational view of the prior art sleeve of FIG. 2;

DETAILED DESCRIPTION OF THE DISCLOSURE

With reference to FIG. 1, an existing milk extraction hose A is shown in a kinked or bent configuration. That is, due to the thinness of the walls of the hose, the hoses are bent or kinked and are unable to function properly to extract milk from a cow and deliver the milk to a tube or pipe B of a milking station for further processing of the milk for consumption. Milk extraction hoses remain under a constant vacuum ranging from about 10.5 in hg to 15.0 in hg. As a result of being exposed to such a vacuum, the compound of each hose deteriorates and loses the strength to maintain the hose's inside walls as a uniformly round or circular opening, the result of which is collapse of the original round hose shape into an oval or oblong shape, which is followed by a kink or bend C in the hose as shown in FIG. 1. A change in the inner opening or space and kinking create pressure differences and a restriction or change of vacuum and reduced flow rate in the hose during the harvesting of milk. These changes or restrictions in the vacuum directly result in decomposition of the compounds in the hose, leading to an increase of disease in the cows producing milk, as well as in people consuming dairy products.

With reference now to FIGS. 2 and 2A, a previous attempt to alleviate the kinking or bending in the hose was an additional sleeve D which was placed over the hose's outer surface near the area that the kinking or bending would take place. As can be seen in FIGS. 2 and 2A, the sleeve was largely ineffective at preventing the hose from kinking.

Figure 3:
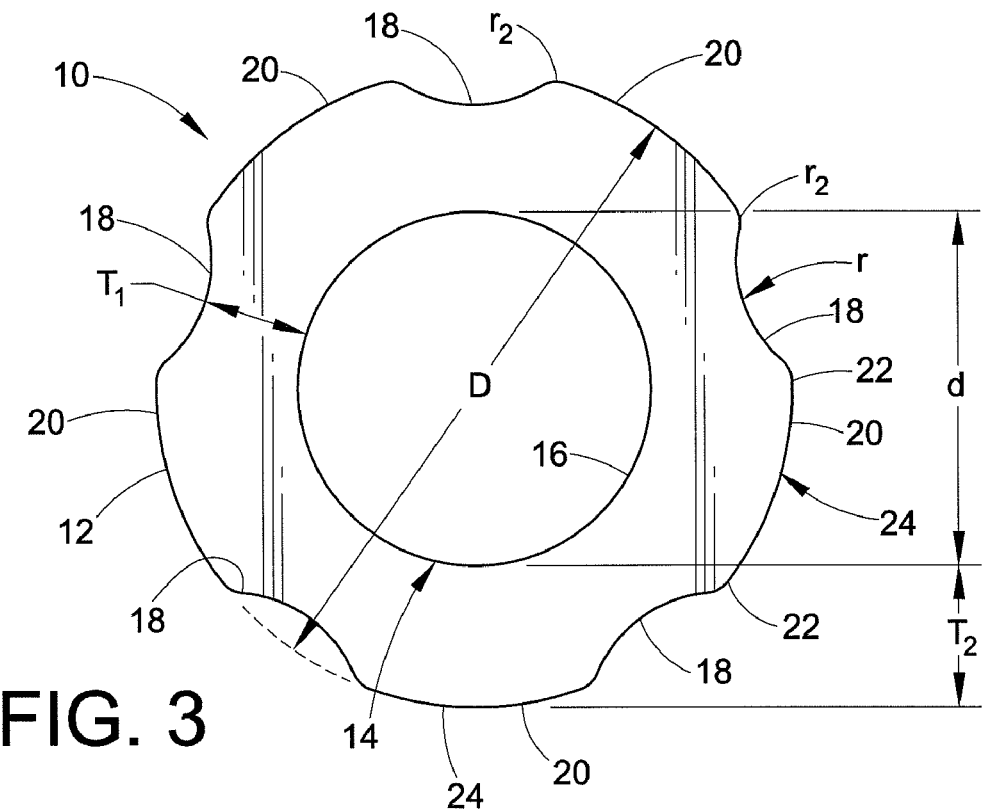
FIG. 3 is a front elevational view of a preferred embodiment of a hose with a rib-and-valley conformation according to the present disclosure.
Figure 3A:
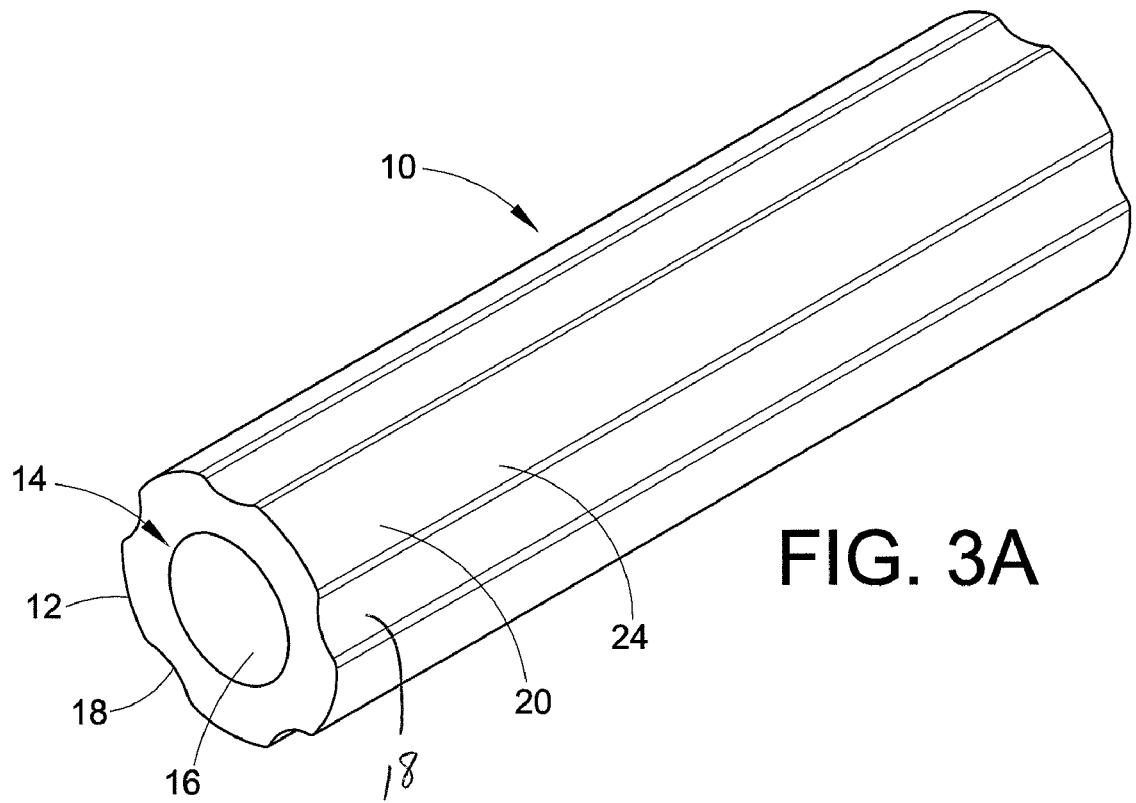
FIG. 3A is a perspective view of the hose of FIG. 3.

With reference now to FIG. 3, a ribbed milk extraction hose in accordance with a preferred embodiment of the disclosure is shown. The hose is used in a dairy farm milk extraction process system similar to that shown in FIG. 1. Hose 10 has an outer wall 12, and an inner wall 14 which forms a circular or round opening 16 in the hose. The hose wall thickness can vary, but is generally around 0.300 inches thick, or any other suitable thickness. The hose can be fabricated from a variety of materials, including rubber, silicone or PVC or any other suitable materials. The hose is typically extruded and has the rib and valley profile along a length of the hose.

Several notches, or recesses or "valleys" 18 are formed around the outer perimeter of the hose. FIG. 3 shows five recesses 18 equally spaced about the perimeter. However, other numbers and spacings of recesses are also contemplated by the disclosure. The recesses are also shown as having a depth or continual radius r in the range of about 0.150 inches to 0.300 inches. The recesses, at their lowest or deepest point, are about 0.200 to 0.225 inches from the inner wall. That is, the wall thickness $T_1$ of the hose ranges from about 0.200 inches to about 0.225 inches, although other thicknesses are also contemplated by the disclosure.

Ribs 20 are formed between each of the recesses. Five ribs are also shown as equally spaced apart around the outer wall of the hose. Other numbers (such as between four and twenty ribs) and spacings of ribs are also contemplated by the disclosure. The ribs have a curvature which basically corresponds to an outer diameter D (between about 1.0 to 2.0 inches) of the hose. The inside diameter d of the opening 16 is about 9/16 (i.e., 0.056) inches to about 1.25 inches. Opposite edges 22 of the ribs have a radius $r_2$ also in the range of about 0.010 inches to about 0.030 inches (average of 0.020 inches). The length of the "flat" outer portion 24 of ribs 20 is about 0.500 inches in length between opposite edges 22. The hose wall has a thickness $T_2$ of about 0.200 to about 0.350 inches or more between the outer portion 24 of the rib and the inner wall 14. Thus, the hose wall thickness overall can vary from about 0.200 inches to about 0.350 inches or more.

The "rib-and-valley" configuration helps support the hose to resist collapsing of the hose under a vacuum. The configuration also resists the common bending or kinking that occurs with the normal smooth outer diameter milk hose. The ribs 20 increase the wall thickness and further act as an internal truss, which supports the rubber material of the hose and helps prevent kinking or collapsing of the hose. The valleys or recesses 18 provide thinner-walled areas, which offer more flexibility and bendability than the standard smooth wall hose allowing the operator more freedom to attach the hose to the cow.

Figure 4:
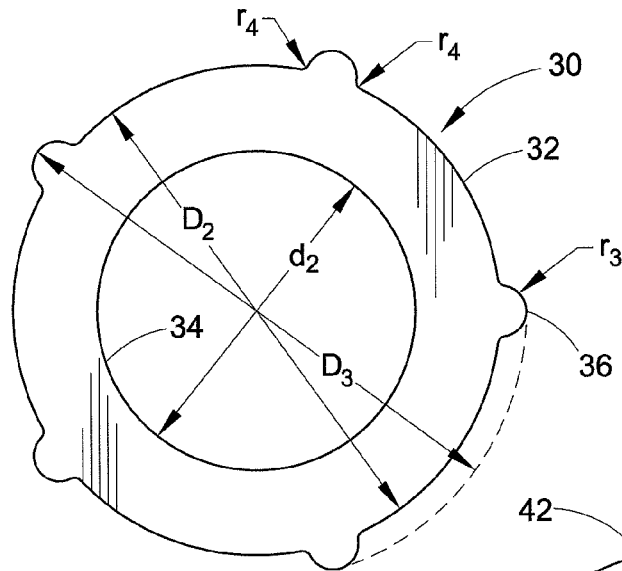
FIG. 4 is a front elevational view of a hose with ribs forming a sprocket shape in accordance with another aspect of the present disclosure.

Referring now to FIG. 4, a variation of the hose configuration of the present disclosure is shown. The hose 30 has an outer wall 32 having an outer diameter $D_2$ of about 1.00 to 2.00 inches, and an inner wall 34 having an inner diameter $d_2$ of about 9/16 (i.e., 0.56) inches to about 1.25 inches. A series of nubs or ribs 36 (five are shown) extend around an outer perimeter of the hose. The ribs 36 each has a radius $r_3$ of about 0.05 inches to about 0.10 inches and form an overall outer dimension $D_3$ of the hose of about 1.1 inches to about 2.2 inches. The ribs are shown as evenly spaced around the hose, but can also be unevenly spaced, and also have a radius $r_4$ of about 0.020 inches formed between outer wall 32 of the hose and the rib.

Figure 5:
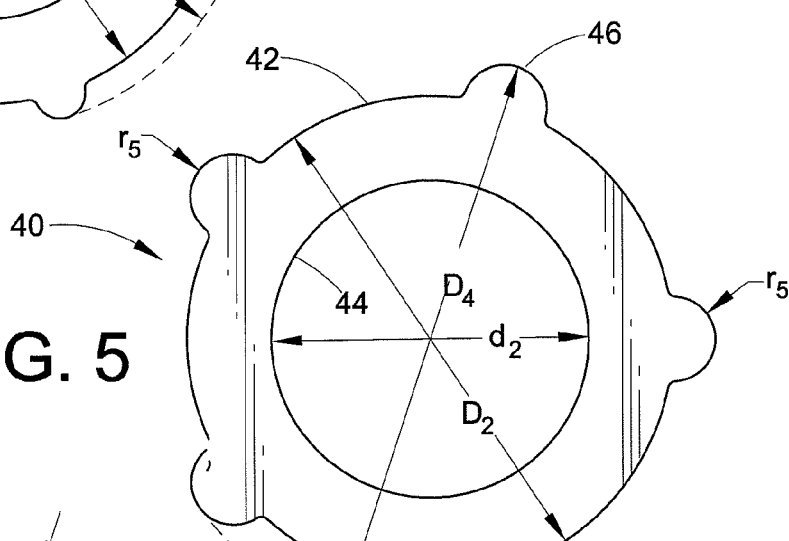
FIG. 5 is a front elevational view of a hose with ribs forming a sprocket shape in accordance with another aspect of the disclosure.

Referring now to FIG. 5, another embodiment of the hose 40 is shown. The hose 40 has an outer wall 42 having a diameter $D_2$ of from about 1.0 inches to about 2.0 inches, and an inner wall 44 having an inner diameter $d_2$ of about 9/16 (i.e., 0.56) inches to about 1.25 inches. Five ribs 46 are shown spaced around the outer perimeter of the hose, forming an outer dimension $D_4$ of about 1.2 inches to about 1.5 inches. Each rib has a radius $r_5$ of about 0.100 to about 0.200 inches, and forms a radius $r_6$ of about 0.020 inches between outer wall 42 of the hose and the rib.

Figure 6:
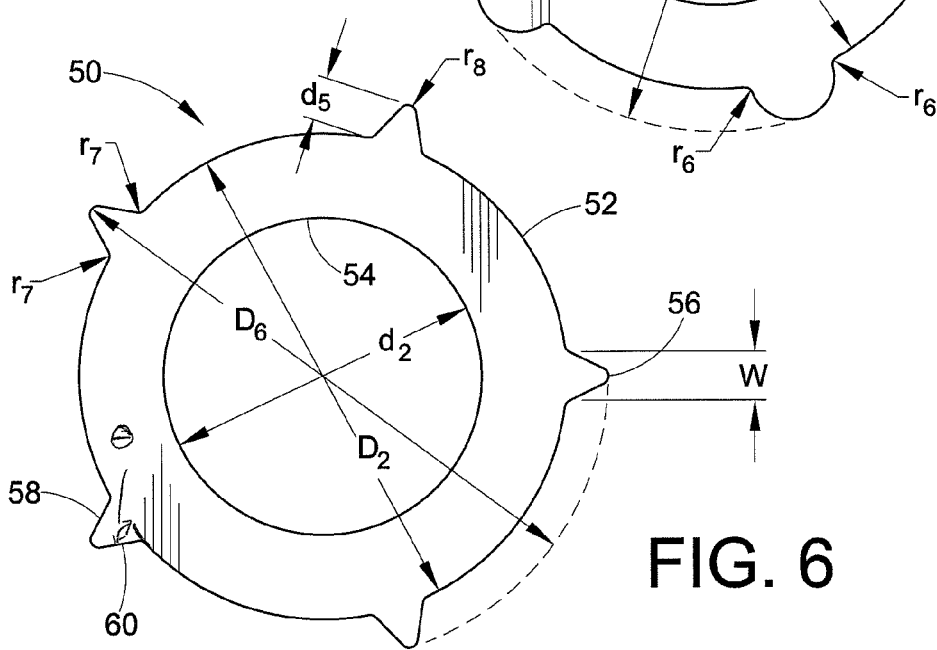
FIG. 6 is a front elevational view of a hose with ribs forming a star shape in accordance with another aspect of the present disclosure.

Referring now to FIG. 6, a hose 50 in accordance with another embodiment is shown. The hose has an outer wall 52 with an outer diameter $D_2$ of from about 1.0 inches to about 2.00 inches, and an inner wall 54 having an inner diameter $d_2$ of about 9/16 (i.e., 0.056) inches to about 1.25 inches. Several (five) angled or triangular shaped ribs 56 are shown formed around an outer wall 52 of the hose. Each rib has a width dimension w of about 0.125 inches and an outer dimension $d_5$ of 0.100 inches and forms an outer dimension $D_6$ for the hose of about 1.2 inches to about 2.2 inches. The hose has a substantially "star shape" formed by these angled ribs. An angle θ between the walls 58, 60 of the rib with the outer surface of the hose can vary from about 10 degrees to about 80 degrees or more. A radius $r_7$ of about 0.020 inches between the outer wall and walls 58, 60 of the rib also is formed. A radius $r_8$ of about 0.020 inches between the two walls 58, 60 is also formed within the rib.

Other variations of the hose ribbed configuration are contemplated by the disclosure. For example, any number of ribs from four to twenty or more formed around a perimeter of the hose can be effective for reducing kinking or bending of the hose and improve the longevity and usefulness of the hose. The ribs can be evenly or unevenly spaced around the outer wall of the hose. Rounded or angled ribs forming a substantially "sprocket" or substantially "star" shape of the hose are also contemplated as well as other shapes of ribs, such as with angled edges or curved edges. The "valleys" or recesses of the hose can also vary in depth and location on the hose wall.

The ribbed hose is described as being used during the extraction of milk in a dairy farm environment. However, other uses for the hose are contemplated, such as the extraction of food or other liquids.

The exemplary embodiment has been described with reference to the preferred embodiments. Obviously, modifications and alterations will occur to others upon reading and understanding the preceding detailed description. It is intended that the exemplary embodiment be construed as including all such modifications and alterations.

The invention claimed is:

1. A milk extracting system comprising:
a one-piece ribbed hose comprising:
an outer wall;
an inner wall having a smooth surface with no ribs formed thereon;
at least two ribs formed on said outer wall, said ribs extending along a longitudinal axis of said hose to prevent kinking of said hose and collapsing of said hose which is placed under a vacuum; and
at least one recess formed between said at least two ribs wherein said recess extends along said longitudinal axis of said hose; and a pipe connected to said ribbed hose for further processing of the milk.

2. The hose of claim 1, wherein said outer wall has a diameter in the range of 1.0 inches to 2.0 inches.

3. The hose of claim 1, wherein said inner wall has a diameter in the range of 9/16 inches to 1.25 inches.

4. The hose of claim 1, wherein said ribs comprise five ribs equally spaced about a periphery of said outer wall.

5. The hose of claim 1, wherein said ribs comprise a surface having two opposite ends, wherein said surface has a length of about 0.500 inches.

6. The hose of claim 4, wherein said at least one recess comprises five recesses equally spaced along a periphery of said hose outer wall.

7. The hose of claim 1, wherein said hose has a thickness in the range of 0.200 inches to 0.350 inches between said inner wall and each of an outermost portion of said at least two ribs.

8. The hose of claim 1, wherein said hose has a thickness in the range of 0.200 inches to 0.225 inches between said inner wall and an innermost portion of said at least one recess.

9. The hose of claim 4, wherein said hose has a thickness of about 0.300 inches between said inner wall and an outermost portion of each of said five ribs.

10. The hose of claim 6, wherein said hose has a thickness of about 0.225 inches between said inner wall and an innermost portion of each of said five recesses.

11. The hose of claim 6, wherein each of said five recesses are formed between two adjacent ribs of said five ribs.

12. The milk extracting system of claim 1, wherein ends of said ribs each has a radius of about 0.020 inches.

13. The milk extraction system of claim 1, wherein said at least one recess has a radius in the range of 0.150 inches to 0.300 inches.

14. The milk extraction system of claim 4, wherein each of said five ribs extends along said longitudinal axis of said hose.

15. The milk extraction system of claim 6, wherein each of said five recesses extends along said longitudinal axis of said hose.

16. The milk extraction system of claim 1, wherein said hose is fabricated from a rubber material.

* * * * *